United States Patent [19]
Coe

[11] Patent Number: 5,384,521
[45] Date of Patent: Jan. 24, 1995

[54] POWER CAPACITOR POWERTRAIN

[76] Inventor: Carlos J. Coe, C/O BDM, 4001 N. Fairfax Dr., Suite 750, Arlington, Va. 22203

[21] Appl. No.: 950,561

[22] Filed: Sep. 25, 1992

[51] Int. Cl.$^6$ .................................................. H02K 7/02
[52] U.S. Cl. .................................... 318/161; 318/139; 290/45
[58] Field of Search ............... 318/139, 140, 150, 161, 318/254, 376; 290/7, 9, 14, 16, 17, 40 R, 45, 51; 29/890.06; 74/572; 310/74, 75 C

[56] References Cited

U.S. PATENT DOCUMENTS

| | | | |
|---|---|---|---|
| 3,769,793 | 11/1973 | Wilson. | |
| 3,788,162 | 1/1974 | Rabenhorst et al. | 74/572 |
| 3,799,284 | 3/1974 | Hender. | |
| 3,858,674 | 1/1975 | Tabor | 318/161 X |
| 3,994,354 | 11/1976 | Haumaier. | |
| 4,000,665 | 1/1977 | Rabenhorst | 74/572 |
| 4,131,171 | 12/1978 | Keyes | 74/572 X |
| 4,218,624 | 8/1980 | Schiavone | 290/45 |
| 4,309,620 | 1/1982 | Bock | 290/45 X |
| 4,597,463 | 7/1986 | Barnard | 180/165 |

*Primary Examiner*—Bentsu Ro
*Attorney, Agent, or Firm*—Dickstein, Shapiro & Morin

[57] ABSTRACT

The present invention involves a mechanical and electrical arrangement for an energy efficient powertrain that reduces fuel consumption and environmental impact. The powertrain consists of a power and torque capacitor, using a flywheel that is fully isolated from the power production elements. The powertrain consists of a mechanically isolated flywheel, a power unit and a power receiving device which can be selectively connected and disconnected through use of electromagnetic joints. The joints are configured to mechanically isolate the power receiving device, the flywheel and the power plant from one another. As a result, the drive shaft to the power plant drives the flywheel through the torque transfer joint at an RPM greater than the maximum RPM for the flywheel. Likewise, the flywheel's minimum speed would be greater than that required for the power receiving device as defined by its rotation rate. The respective electromagnetic joints would also be operated as generators/motors so that differential rates between the main drive shaft and the flywheels are sensed, and those joints are activated to provide torque to the flywheel. In addition, the invention provides a new construction for flywheels and containers to maximize safety while reducing the weight load requirements for the flywheel and its container.

14 Claims, 8 Drawing Sheets

POWER CAPACITOR POWERTRAIN

FIELD OF THE INVENTION

The present invention relates to a fuel efficient powertrain utilizing a flywheel construction which is mechanically isolated from the power unit and power receiving devices, as well as a novel flywheel composition and construction.

BACKGROUND OF THE INVENTION

Flywheel technology dates back to the days of early steam power systems when flywheels were used to provide continuity of motion for the long and uneven power strokes. Such applications were feasible since the rotational speed of the steam engine shafts were usually less than 500 RPM. With increased engine speeds, the use of flywheels as separate and distinct components greatly diminished. However, with the recent need for increased fuel efficiency in automobiles, flywheels have become important sources of stored energy. Specifically, conventional non-flywheel vehicle powertrain systems are inefficient since powertrains are sized only for peak power requirements. Energy is expended and thus lost during idle, low power driving or braking. To alleviate these losses current vehicle flywheel systems use a flywheel as a supplement to existing powertrains to effectively conserve energy loss. However, current systems contain drawbacks that reduce their effectiveness.

For example, a recent flywheel prototype was described in the article, "The Design of An Engine Flywheel Hybrid Drive System for a Passenger Car" by Schilke et al. which discloses an engine flywheel hybrid drive for a compact car that utilizes a flywheel to reduce peak power demands on a conventional car engine. The flywheel is used to recover braking, to reduce peak power demands and to provide a second energy source during idle or unpowered decelerations. The Schilke et al. flywheel is not arranged as an in-line drive component in the powertrain but as a supplementary power source outside the powertrain. Thus, the energy saving capacity of the flywheel is not maximized and the transmission and control scheme to effectuate flywheel power is necessarily complex.

Other systems have employed flywheels as generators for powering electric motors. For example, the General Electric Company has developed a full-size commuter bus using a flywheel-based electric propulsion system. The system is based on a three thousand pound flywheel that powers the bus after being appropriately charged and then recharged along the bus route. The flywheel is used as the main source rather than relying on another engine or motor. The main disadvantage of this arrangement is that the flywheel is used to store kinetic energy which is then converted to electricity and finally back into kinetic energy of the vehicle motion. Furthermore, an extremely large and heavy flywheel is necessary which is unworkable for an ordinary passenger vehicle. Finally, the configuration is impractical for long range purposes. The General Electric flywheel must be recharged every 3.5 miles so that it is only practical for short commuter distances having electrical cables.

A further problem with current flywheel designs is the limitations that their construction places on flywheel containment housings. Because of the necessity of designing a flywheel of appropriate size and dimension to maximize inertia, flywheels have to be relatively large and turn at relatively high RPM's to store sufficient energy to drive/power a vehicle. The containment of the flywheel thus represents a significant technical challenge: it must be sufficiently confined so that catastrophic events, such as an accident or a bearing failure, do not cause the flywheel to break free and injure bystanders. Finally, the design must be compact, lightweight and cost efficient. Current systems, however, fail to provide a flywheel with high energy storage capacity whose overall system weight is minimized and whose operations are safe for small vehicles.

SUMMARY AND OBJECTS OF THE INVENTION

In view of the foregoing, it should be apparent that a need exists in the art for an apparatus and method for providing efficient powertrain performance and fuel consumption by using a flywheel based powertrain and flywheel construction and composition which is highly fuel efficient, which is lightweight and which is sufficiently safe for public use. It is, therefore, a primary object of the invention to provide a powertrain arrangement which significantly increases fuel mileage over conventional powertrains and which is well suited for various types of power applications. More particularly, it is an object of this invention to use a flywheel to fully isolate the power requirements of the system from that associated with the production of the power plant or energy source.

It is also an object of this invention to provide a powertrain in which the major components: the power plant, the flywheel, and the load, are mechanically isolated from each other so that torque is transferred between each component of the system without the resulting energy loss that is caused by mechanical transmissions.

Another object of the present invention is to provide a safe, reliable, lightweight, inexpensive flywheel and flywheel container.

A further object of the invention is to provide a flywheel which is of a construction that maximizes automobile safety by using material of high strength and low ductility for the flywheel. As a consequence of the construction, the flywheel fractures in extreme events, into small particles which dissipate the energy of the flywheel.

It is yet a further object of the invention to provide a flywheel container of lightweight construction which is sufficiently fortified to contain the particles of the disintegrated flywheel.

Briefly described, these and other objects of the invention are accomplished in accordance with its apparatus aspects by providing a vehicular drive system for conserving energy through efficient power utilization. The drive system consists of an electric control means providing electrical signals for controlling the drive system. A motor for driving the motor output shaft is connected to the electrical control system and to a main drive shaft. The main drive shaft is in turn associated with a main shaft torque joint controlled by the electric control system. The torque joint consists of a brushless slotless DC motor. A second torque joint is connected at an opposite side of the flywheel. The flywheel is adapted to freely rotate about its hub. The load receiving device, such as a vehicle wheel, is attached to an output of the second torque joint. The joints act to transfer torque to the flywheel from the motor and/or load receiver and from the load receiver to the flywheel.

The method of the present invention is carried out by energizing a motor, driving a main shaft connected to the motor, connecting a flywheel to the main drive shaft through a main shaft torque joint, selectively transferring torque to a load bearing element through a second torque joint in order that the flywheel can be respectively transfer torque to load bearing device without a mechanical interface. An efficient transfer of torque and a minimization of energy loss thus results.

With these and other objects, advantages and features of the invention, the nature of the invention is described in more detail with reference to the following detailed description of the invention, the appended claims and to the several drawings attached.

DETAILED DESCRIPTION OF THE PREFERRED EMBODIMENTS

Figure 1:
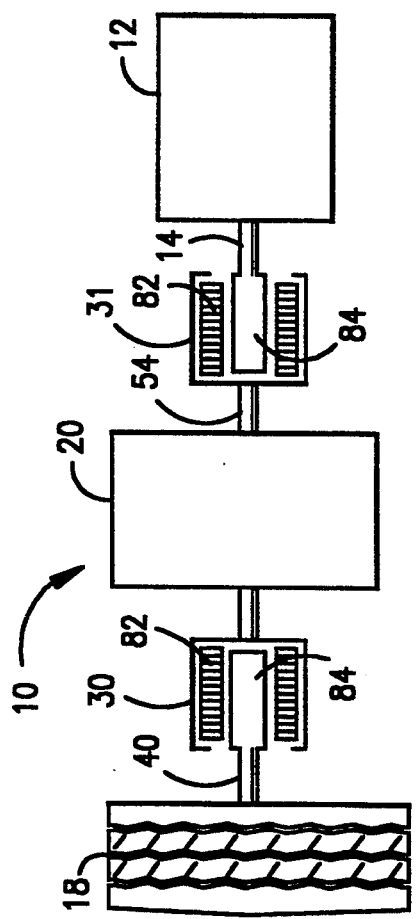
FIG. 1 is a schematic diagram of an advanced power capacitor according to a preferred embodiment of the present invention.

Referring now in detail to the drawings wherein like parts are designated by like reference numerals throughout, there is illustrated in FIG. 1 a schematic view of the advanced power capacitor 10 according to the preferred embodiment of the present invention.

The advanced power capacitor 10 employs a power unit 12 connected by any suitable arrangement to a main drive shaft 14. The drive shaft 14 is in turn is connected to a first torque transfer joint 31. The torque transfer joint 31 has an output shaft 54 which is attached to the flywheel 20. Both the torque output shaft 54 and the flywheel 20 are free to rotate and are not mechanically connected to the drive shaft 14.

The torque transfer joint includes a rotor 84 which is connected to shaft 14. The stator 82 is connected to the flywheel and to the connection shaft 54 so that the stator is adapted to rotate with the flywheel 20. This arrangement results in torque transfer from shaft 14 to flywheel 20. Additionally, the shaft of the flywheel is connected to a second torque transfer joint 30. The stator 82 of the torque joint 30 is also attached to the flywheel 20 by means of the connection shaft 54 by means of a second connection shaft 40 connected to a power receiving device 18. As a result of the present arrangement, each of the major components, engine 12, flywheel 20 and tire 18, are mechanically isolated from each other by virtue of the non-mechanical connection (electromagnetic) between stator 82 and rotor 84 of the torque transfer joints 30 and 31. Each component is thus allowed to rotate at different speeds. For example, main shaft 14 can rotate at a certain constant speed while shafts 54 and 40 rotate at different speeds and varying. However, a variable speed embodiment may also be used.

FIG. 1 shows the power capacitor 10 for use in vehicles, such as cars. However, the present invention can be used for other types of vehicles such as trucks, buses, recreational vehicles, commuter and long haul trains, and auto-piloted vehicles. The present invention can also be used in non-vehicle applications, such as in special machinery (e.g., lathes), power plants or even human powered devices (bicycles). In addition, the present arrangement can be used in conjunction with a variety of types of engines or energy sources such as internal combustion engines, electric motors and/or sterling engines, turbines, or alternate fuel sources, such as natural gas.

Each of the torque transfer joints 30 and 31 involve, in the preferred embodiment, an electro-magnetic device. However, other types of variable frictional joints, such as hydraulic joints may be employed instead of the DC motor/generator (dynamo). Preferably the electromagnetic device would be a DC brushless, slotless motor/generator since the rotor 84 and stator 82 are arranged to rotate relative to one another, the torque joint motor can also be called a differential. An example of a DC motor is the slotless, brushless motors manufactured by Elinco, Inc., models SB-40 and above.

Each of the torque joints 30 and 31 is controlled by an electrical control (not shown) device for energization/de-energization of the windings. The brushless, slotless DC motor/generator provide fine control and efficient transfer of torque at differential RPM's. It also avoids the deficiency of the locked rotor and unstable responses typical in other types of DC and AC motors/generators.

The configuration shown in FIG. 1 uses the flywheel 20 as the central component of the powertrain. Hence, the flywheel 20 is not relied upon to smooth power strokes or shave power requirements but to supply all direct power requirements for the tire 18. Power plant 12 provides energy to the flywheel 20 through shaft 14 and through the rotor of the shaft torque joint 31. The in line configuration shown in FIG. 1 thus replaces the requirement for a transmission, reduces the number of mechanical moving parts in the system and improves efficiency. Moreover, the torque joint 31 and torque joint 30 mechanically isolate and thus entirely decouple flywheel 20 from the motor 12 and tire 18 without energy losses associated with mechanical transmissions and clutch systems. System control is also substantially simplified.

In operation, (which is set forth in further detail below in conjunction with FIG. 6) as torque is transferred from flywheel 20 to tire 18, the flywheel's RPM is reduced as the vehicle accelerates or maintains a constant speed. Once the flywheel falls below a specified minimum RPM, the power plant 12 is activated to add energy to the flywheel rotation. In other words, the control scheme provides an connection between flywheel 20 and engine 12 so that energy is transferred to the flywheel 20 at an optimum constant RPM torque and horsepower. The engine 12 provides torque to the flywheel 20 through torque joint 31 until the flywheel reaches its maximum RPM. In this manner, energy is added to the flywheel 20 and to the powertrain system efficiently.

During braking, torque from tire 18 is transferred to the flywheel through shaft 40 and the electro-magnetic joint 30. The braking energy acts to spin up the flywheel so that energy is preserved. Note that the braking operation is done by a kinetic to kinetic transfer without energy transformation (mechanical-electrical) and the associated energy loss. Further information on the braking operations are detailed below in FIG. 6.

In this embodiment, the cylindrical flywheel 20 is powered by a single constant speed power source or engine 12. However, a variable speed power source, or multiple power sources can also be used. Also, in this configuration, the drive shaft 14 drives the flywheel through the torque transfer joint 31 at an RPM that is greater than the maximum desired RPM for the flywheel. The flywheel's minimum rotational speed would be greater than the vehicle's current operating speed, as defined by the rotation rate. To transfer torque from the power plant to the flywheel, the torque transfer joint is operated as a generator. In other words, the differential rotation rate between the main drive shaft 14 and the flywheel shaft 54 provides torque to the flywheel and thus loads the vehicle's power plant. Similarly, torque from the flywheel 20 to the tires 18 is provided by operating electro-magnetic joint 30 as a generator. The applied torque to the tire 18 along shaft 40 accelerates the vehicle and thus loads the flywheel.

During braking, the electro-magnetic joint 30 would be operated as a motor and the resulting apparent differential between the tire 18 and the flywheel 20 would transfer a negative torque to the tire and a positive torque to the flywheel. Braking thereby spins up the flywheel and preserves the energy which is normally lost in conventional vehicles.

Assuming that the inertia of the flywheel is sufficiently large, these operations result in a vehicle having smooth and quick acceleration at all speeds. Power on demand is also available at all times for rapid acceleration, passing and maintaining speed up steep grades. Fuel efficiency of the powertrain is also greatly improved particularly in the city and for other low speed areas of activity. Fuel efficiency would be somewhat less improved for highway driving but will vary depending upon the speed of the vehicle, the road conditions and the manner in which the operator drives. However, driving in hilly or mountainous terrain will again be linked to speed, since energy going up and down positive and negative grades is conserved by the flywheel and lost by a conventional motor. Unlike conventional power trains, the miles per gallon of the advanced power capacitor 10 is not especially sensitive to the mass of the vehicle. The design of FIG. 1 is applicable to large vehicles where fuel efficiency is more critical (vans, luxury cars, buses, trains, etc.)

If the power source is an electric motor, the system can employ a constant speed electric motor which is more efficient than variable speed motors used in conventional electric vehicles. This is because variable speed motors depend upon electric motors to drive the vehicle; whereas in the present invention, the flywheel acts as the drive and only employs the electric motor to spin up the flywheel to its maximum RPM. A constant speed motor can be used in the present arrangement.

Additionally, conventional electric vehicles depend upon a large bank of batteries to be recharged in order to drive the electric motor. In the present arrangement, however, a flywheel acts effectively as the power source. Large battery systems are not required. Also, the constant speed of the electric motor runs at power levels which are a fraction of the peak power requirements that conventional electric power plants are required to operate at. The power capacitor 10 and the motor 12 can thereby operate using a small bank of standard batteries. Alternatively, the present invention can be used to obtain greater range with conventional electrical car battery arrangements. Finally, the advanced power capacitor powertrain 10 minimizes the number of times energy is transformed from electric to kinetic and back to electric.

Another mode of operation for the electric vehicle version of the advanced power capacitor power train is to use the recharging source (ac power) to charge spinup the flywheel prior to disconnecting the vehicle rom the recharging source. In this way, energy stored in the battery bank is only used to replenish the flywheel.

The advanced power capacitor powertrain 10 can also be used for combined power plant vehicles. For example, a constant speed electric motor and internal combustion engine can be used as the power source 12. In this case, the vehicle would operate using the electric motor 12 until the batteries (not shown) are depleted. Then, the internal combustion engine would assume the power function, making this vehicle suitable for both commuter and long transit purposes.

Figure 2:
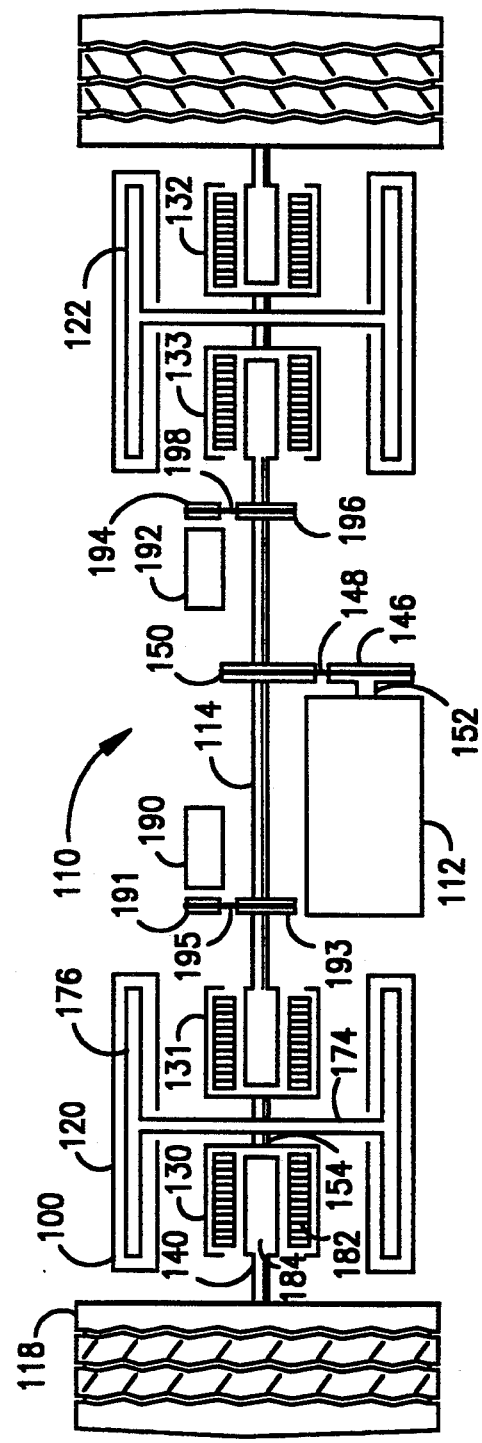
FIG. 2 is a schematic diagram of a two-wheel drive vehicle using the advanced power capacitor system according to a second preferred embodiment of the invention.

Referring now to FIG. 2, a schematic diagram of a two-wheel drive vehicle using the power capacitor system according to a second preferred embodiment of the invention is shown. The two wheel drive system 110 consists of a main power unit 112 which can comprise an internal combustion engine, or an electric powered motor or other types of motor arrangements described above in reference to FIG. 1.

Specifically, the motor produces torque for output shaft 152 which in turn provides torque to the pulley 146. A belt 148 is reeved about the pulley 146 and about a second pulley 150 connected to the main drive shaft 114. Other gearing and/or direct drive arrangements can be substituted in place of the pulley/belt structure shown.

The main drive shaft 114 is mechanically connected to auxiliaries 190, 192. Each of the auxiliary elements 190, 192 represents a power component such as an air conditioning compressor and/or power steering unit. The auxiliary units are powered by the torque from the main power shaft.

Figure 4:
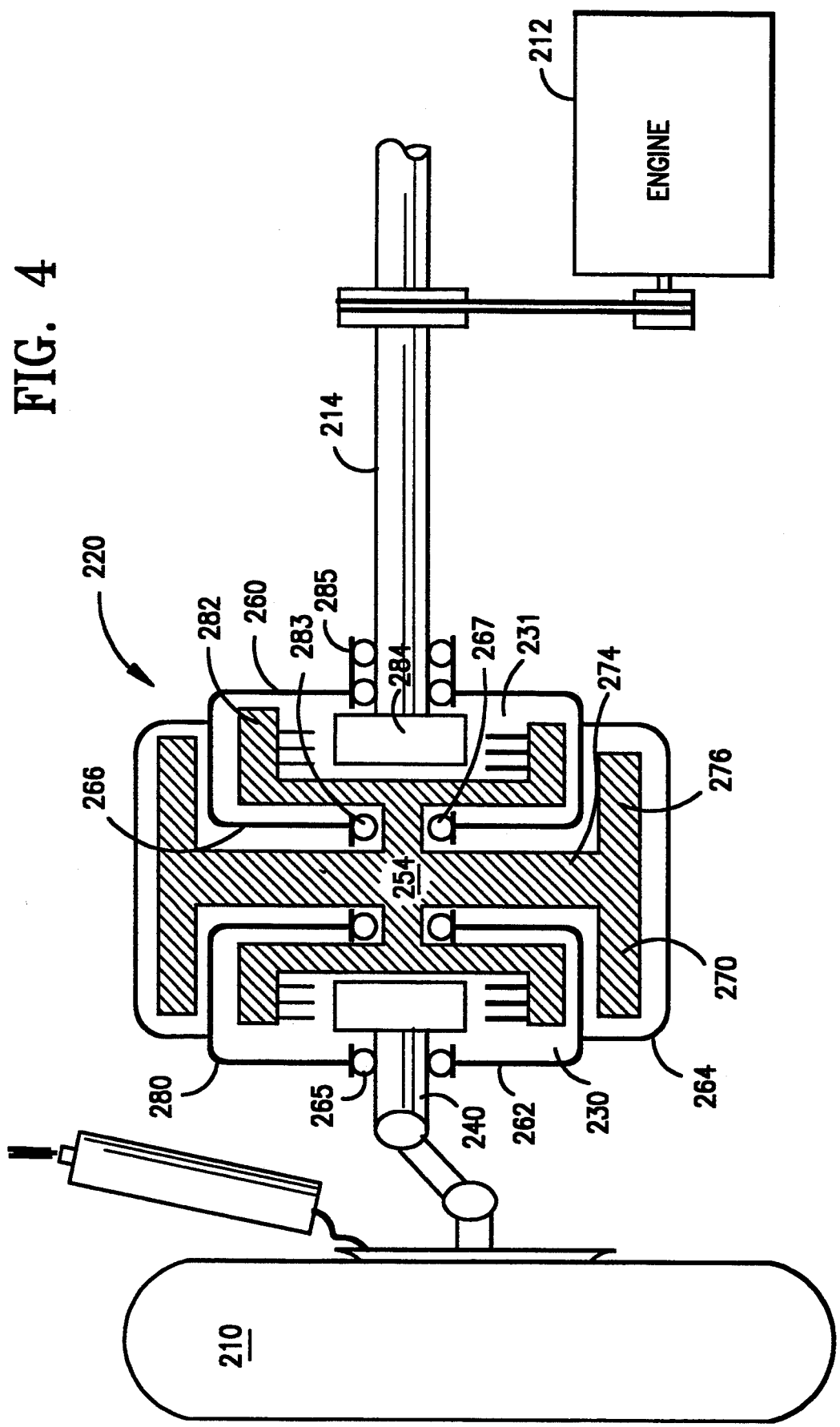
FIG. 4 is a cross-sectional view of the flywheel of FIG. 1.

The overall front wheel drive arrangement of FIG. 2 includes two respective torque joints on the main drive shaft side 131, 133, each being associated with a respective flywheel 120, 122. Each flywheel is cylindrical in cross-section. Details regarding the construction of each flywheel are shown in FIG. 4. Generally, the flywheels consist of a spoke 174 connected at one end to a hub which is mounted by a suitable frictionless bearing on the torque joint shafts 154. The flywheel rim 176 is connected respectively to the other end of the spoke 174 and is contained within the housing 160. The construction of the flywheel is such that its mass is largely contained about its rim 176, increasing the amount of energy and power it can produce and store. A load torque joint 130 is also connected to a rotating shaft 140 to produce torque for the tire 118.

Figure 3:
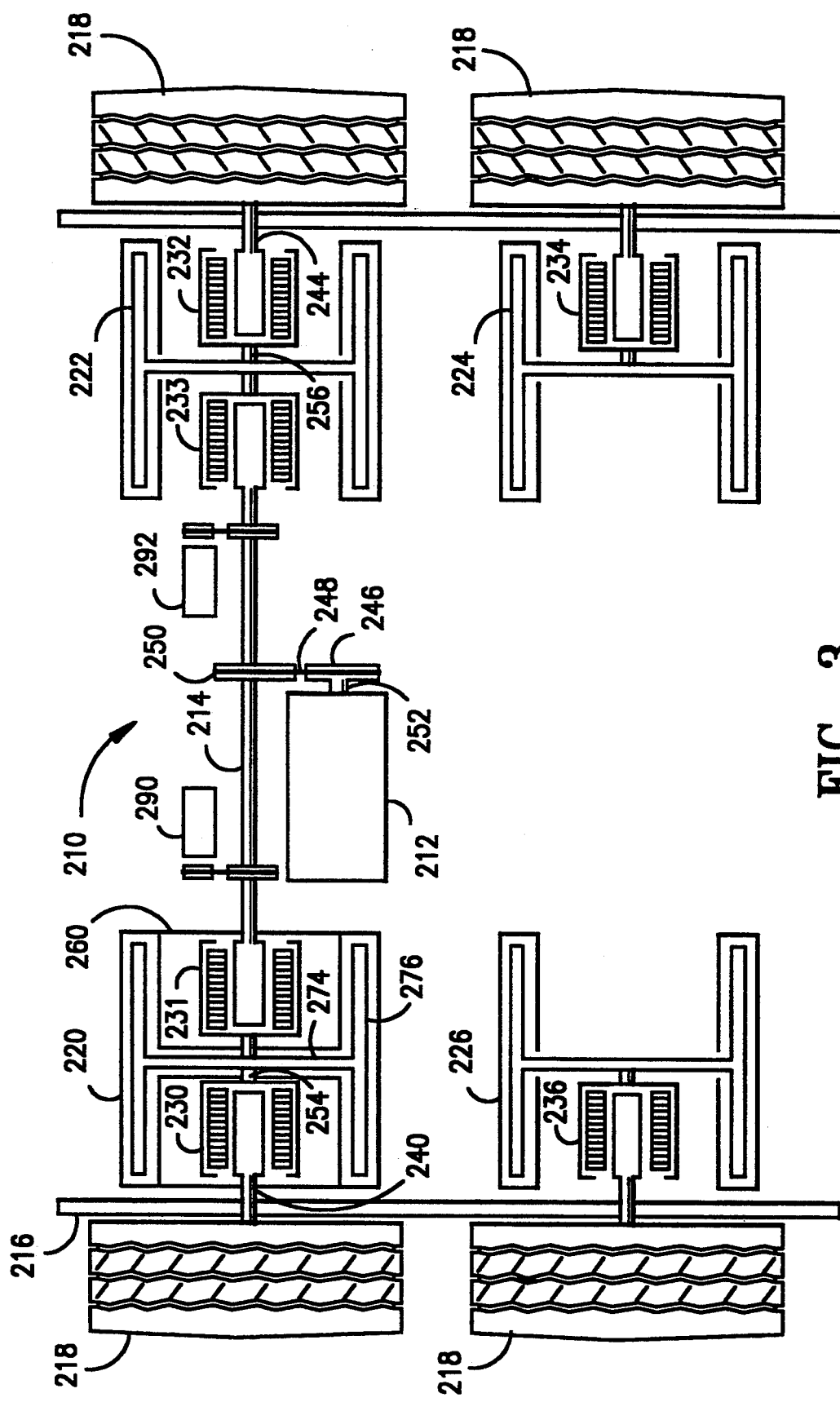
FIG. 3 is a schematic diagram of a four-wheel drive vehicle using the advanced power capacitor system according to a third preferred embodiment of the preferred invention.

Referring now to FIG. 3, a four wheel drive embodiment of the flywheel drive system is shown. This embodiment is effectively identical to that shown in FIG.

2 with the exception of additional flywheels 224 and 226 which are energized by movement of the vehicle or initially dynamically charged by the torque joint acting as a motor while the vehicle is in park and the mechanical brakes are engaged.

AS shown, the tires 218 depend upon the outputs of four flywheel arrangements 220–226, two of which (220, 222) are respectively driven by the main power shaft 214. As an alternative arrangement, the drive shaft 214 can also be connected to flywheels 224, 226 through a suitable mechanical connection (not shown).

FIG. 4 is a cross-sectional view showing the flywheel torque transfer joint construction and arrangement 220 illustrated in FIG. 3 (upper left flywheel). The flywheel 220 is contained within housing 260. The housing also encloses the torque joints 230 and 231. The housing is constructed so as to provide adequate support through the bearings to the flywheel and torque joints, particularly along the shafts 254, 240 and 214. Both joint shafts 240, 254 and main drive shaft 214 are supported by the housing covers 262 RX.

The torque joints 230, 231 each respectively include an inner winding 284 (rotor) and an outer winding 282 (stator). Both windings are also energized/de-energized by means of an inner winding contact 285, and an outer winding contact 283. Both sets of contacts are connected to the electrical control (not shown) via connecting cables 294 and 296. The contacts can either be mounted on slip rings (not shown) or other suitable known connections which allow free rotation of both rotor and stator.

The torque joints are supported on the housing 262 by means of bearings 265 and 267. Additionally, a bearing 255 is located between shaft 254 and the spoke hub 274. The bearing is arranged to be substantially frictionless. Suitable bearing include oil-ring bearings which can support substantially frictionless rotation up to 8000 RPM. Example of suitable bearings include Sleevoil ® RXT 22207 rated @8000 RPM.

The bearings are in turn supported on various portions of the housing containing the flywheel mounted to the vehicle body. The flywheel housing includes a rim housing portion 264 containing the flywheel rim 270 and a spoke housing portion 266 which supports the bearing 267.

Figure 5:
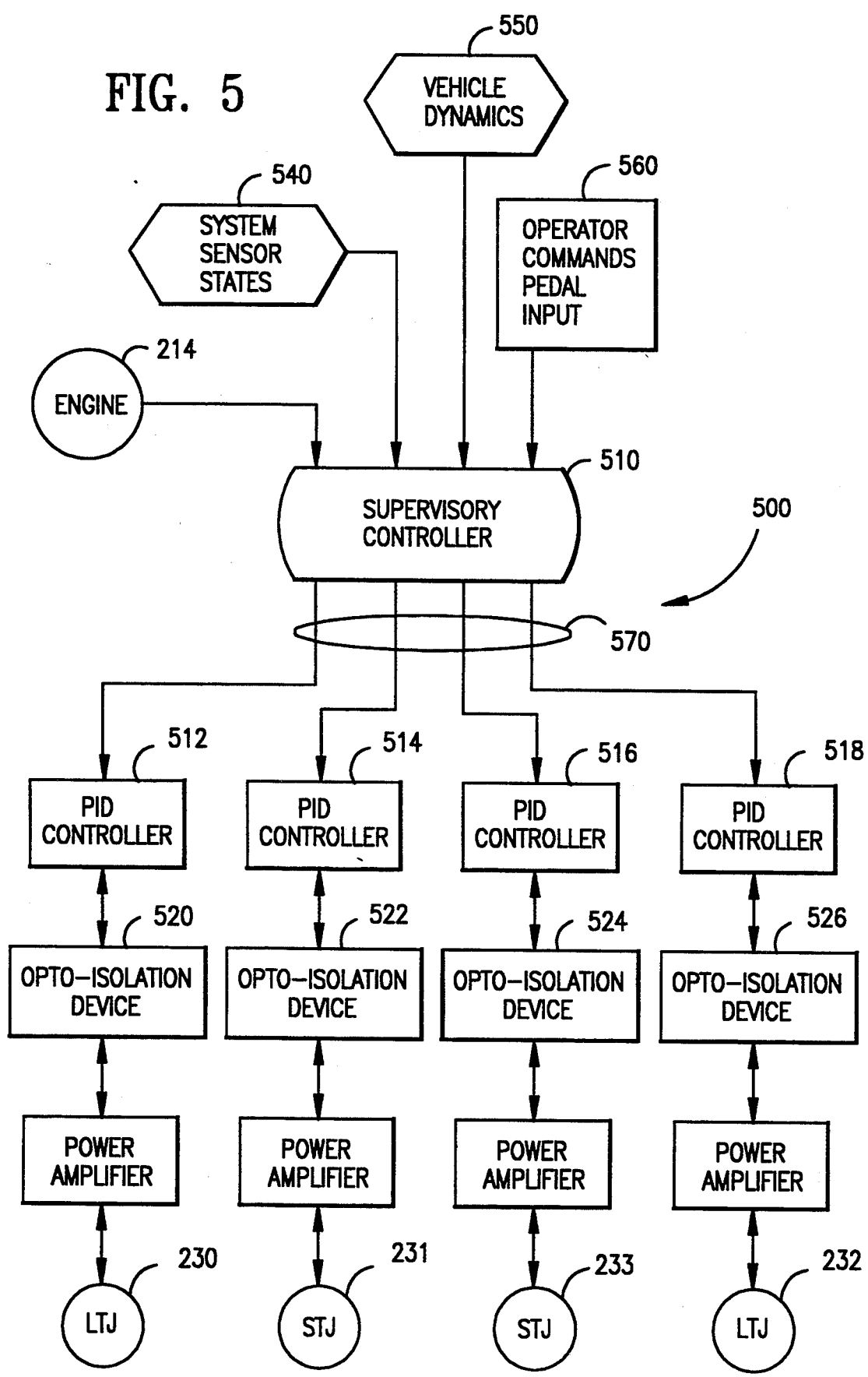
FIG. 5 is a schematic diagram of the electrical control system for the power capacitor of system of FIG. 1.

Referring now to FIG. 5, the electrical control system 500 for the present invention is illustrated. The control system consist of three major components: the supervisory controller 510, the low level controllers 512, 514, 516 and 518, optoisolution devices, and power amplifiers 520, 522, 524 and 526.

The supervisory controller 510 provides the main processing, monitoring and signaling to control the transmission, acceleration, braking and flywheel operations in response to system sensor states, engine parameters, vehicle dynamics, and most critically, operator commands. The supervisory controller 510 comprises a high speed microprocessor and memory component adapted for use in automotive environments. Any one of a number of types of a microprocessor chips and memory devices along with appropriate logic circuits conventionally available can be employed and can also be combined with any known logic arrays, or high speed math co-processors.

Control parameters can also be appropriately stored in the controller 510 memory (not shown) as table look-up arrangements so that processing speed is minimized. The supervisory controller 510 can also rely on more than one microprocessor. It can employ, for example, several dedicated processors whose functions can be attributed to monitoring system sensors, providing high speed table look-up to control torque joint electro-magnetics, or for providing quick responses to operator commands and inputs. The supervisory controller 510, therefore, can be designed in many configuration adapted to efficiently provide feedback control based on direct inputs from the engine 214, from a plurality of system sensors 540 reflecting vehicle dynamics (i.e., turning, etc.) and/or from operator commands such as acceleration, braking.

More specifically, the engine functions 214 monitored by the supervisory controller include on/off conditions of the engine 214, engine speed i.e., RPM, as well as typical engine parameters such as temperature, oil levels, coolant levels and vacuum, etc. The system sensor states 540 measured by the supervisory controller 510 include a variety of parameters related to the powertrain 210. Those sensors include a sensor for measuring RPM and torque on shafts 240 and 254. Additionally, the RPM of the flywheel is monitored along with the RPM of tire 18.

Vehicle dynamics 550 relate to the state of the vehicle being operated. For example, if the user is turning the vehicle, the supervisory controller 510 can provide appropriate control to avoid excessive inertia on the steering mechanism and compensate for uneven powering when the vehicle is turning. Finally, operator commands received by the supervisory controller include an electrical reading of the pedal position for acceleration and pedal position for the brakes.

The supervisory controller 510 communicates via the appropriate buses 570 to a plurality of local controllers 512, 514, 516, and 518. Each of the controllers may be a proportional integral derivative (PID) type controller adapted to quickly provide operational control to torque joints 231–233. However, other types of controllers adapted to the function of the present system can be employed. The type of control provided by each controller 512–518 is purely related to torque joint electrical magnetization provided either to the stator along lines 582 or the rotor along lines 584. Digital signals from each controller 512–518 are sent to the power amplifier controllers through the optoisolation devices.

In operation, when the driver applies the brake pedal, for example, the supervisory controller 510 monitors the brake pedal line. Electrical signals on the line may be provided by an appropriate position sensor to indicate pedal position. The sensor signal is then converted in the supervisory controller 510 to a torque level signal which, in this instance, will be applied to PID controllers 512 and 518, respectively. Each of the controllers 512, 518 then converts the stator and rotor settings provided by the supervisory controller to an appropriate current setting which is used by the power amplifier to set magnetization levels for the rotors and windings along lines 582, 584. Hence, braking control will be controlled by the supervisory controller and implemented by PID controllers 512, 518. Further details regarding the operations of the electrical control system are provided with reference to FIGS. 6A–6D which sets forth the logical flow of the electrical systems operations which are implemented for computer software or other appropriate hardware logic.

Figure 6A:
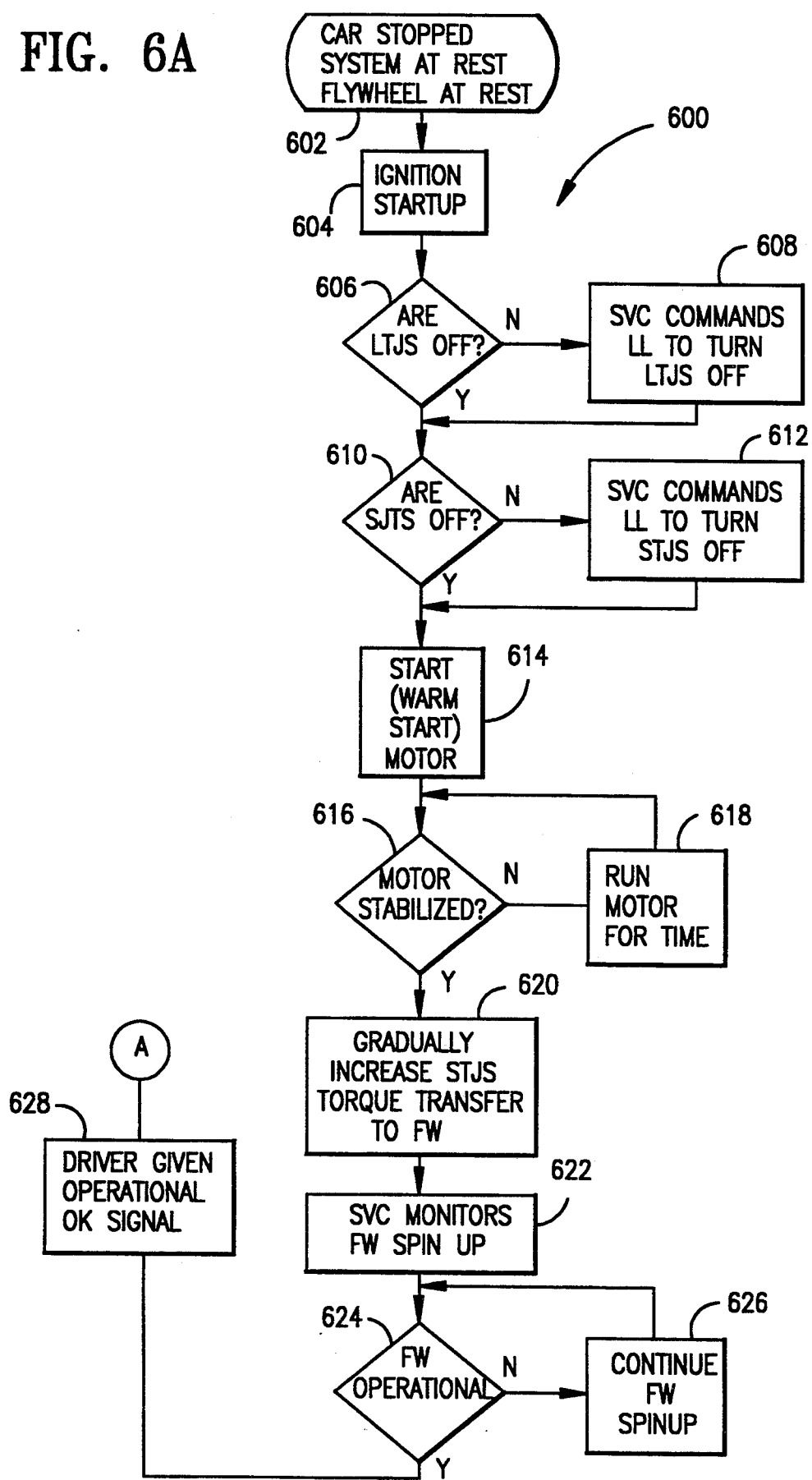
FIGS. 6A–6D are flow diagrams of the control sequence used for operating the system of the present invention.

FIG. 6A is a logic flow diagram of the start-up sequence for the powertrain shown in FIGS. 1–5. In operation, at step 602 the car is in a rest condition. The rest condition indicates that the car is completely stopped with the engine turned off and the flywheel at rest. Start operations are initiated in the same manner as a conventional vehicle The ignition may be any conventional vehicle ignition, particularly if the system power plant 14 is an internal combustion engine.

When the operator initiates the start cycle, the supervisory controller 510 immediately tests the torque joints in order that engine initiation will not cause unintended acceleration. Thus, the load torque joints 130, 132 ("LTJ's") are tested at step 606 to determine whether magnetization is completely nonexistent. If the LTJs are not turned off, then at step 608 the supervisory controller (SVC) commands the low level controllers (LL) to turn the LTJs off. At step 610 the shaft torque joints ("STJ") are also tested. As previously described, if the STJ's are determined to be on, the supervisory controller 510 will command the lower level controllers to turn them off at step 612. Once all torque joints are turned off, the power plant starts at step 614. To reduce engine starting time and to reduce environmental impact a "warm start/hot charge" cycle can be initiated. Motor operation is then begun.

The system then enters a load test 616, 618 to determine whether or not the motor is stabilized i.e., the motor is running at its system speed. To test the motor, an RPM sensor is located on the motor and is in turn connected to the supervisory controller 510. The supervisory controller continuously monitors the engine both after start-up and during operation (not shown). Thus, if the motor 510 is not at its operational level, then the motor is run for a predetermined period of time until it is tested again in this cycle.

Once the motor is stabilized, the torque transfer from the shaft torque joints (131, 133) to the flywheels 120, 122 begins. Torque transfer is gradually increased and is accomplished by virtue of the supervisory controller SVC 510 sending an appropriate digital signal to the low level controllers to gradually increase the current to the LTJ magnets. Additionally, the supervisory controller 510 continuously monitors the torque of the flywheels 120, 122 at step 622, 624 and then compares the flywheel RPM and determines whether it has reached its maximum level. If the maximum has not been reached then at step 626 flywheel charging continues.

The supervisory controller's monitoring of the flywheel is constant and continuous throughout the operation of the other parts of the system so that a change in the flywheel rotation will occur any time during the operation of the system illustrated in FIGS. 6A–6D. Change in conditions will cause an immediate torque transfer between STJs 131, 133, motor 112 and flywheels 120, 122.

Once the flywheel has reached an operational level, then the system provides an appropriate audio/visual signal to the driver to start acceleration.

Four gears are provided by the present invention. Park, Neutral, Drive and Reverse. In the Park gear the vehicle is stationary. In this gear the external brakes are automatically set by the supervisory controller 610. In addition, the LTJs 130 and 132 are fully disengaged so that no drive can be embarked through the load bearing devices 118. Moreover, the STJs 131, 133 are only engaged if the engine is on and start-up has been initiated. The start-up mode, previously described with regard to FIG. 6A, can only be initiated from the Park gear. An additional safety feature includes an emergency stop of the flywheel which can be operator-initiated or automatically initiated by the supervisory controller in an emergency at any time.

The second gear, Neutral, is a safety gear. In this gear, the brakes are not engaged. However, both the load torque joints 130, 132 and the shaft torque joints 131, 133 are disengaged. In Neutral, the engine is always turned off.

Figure 6B:
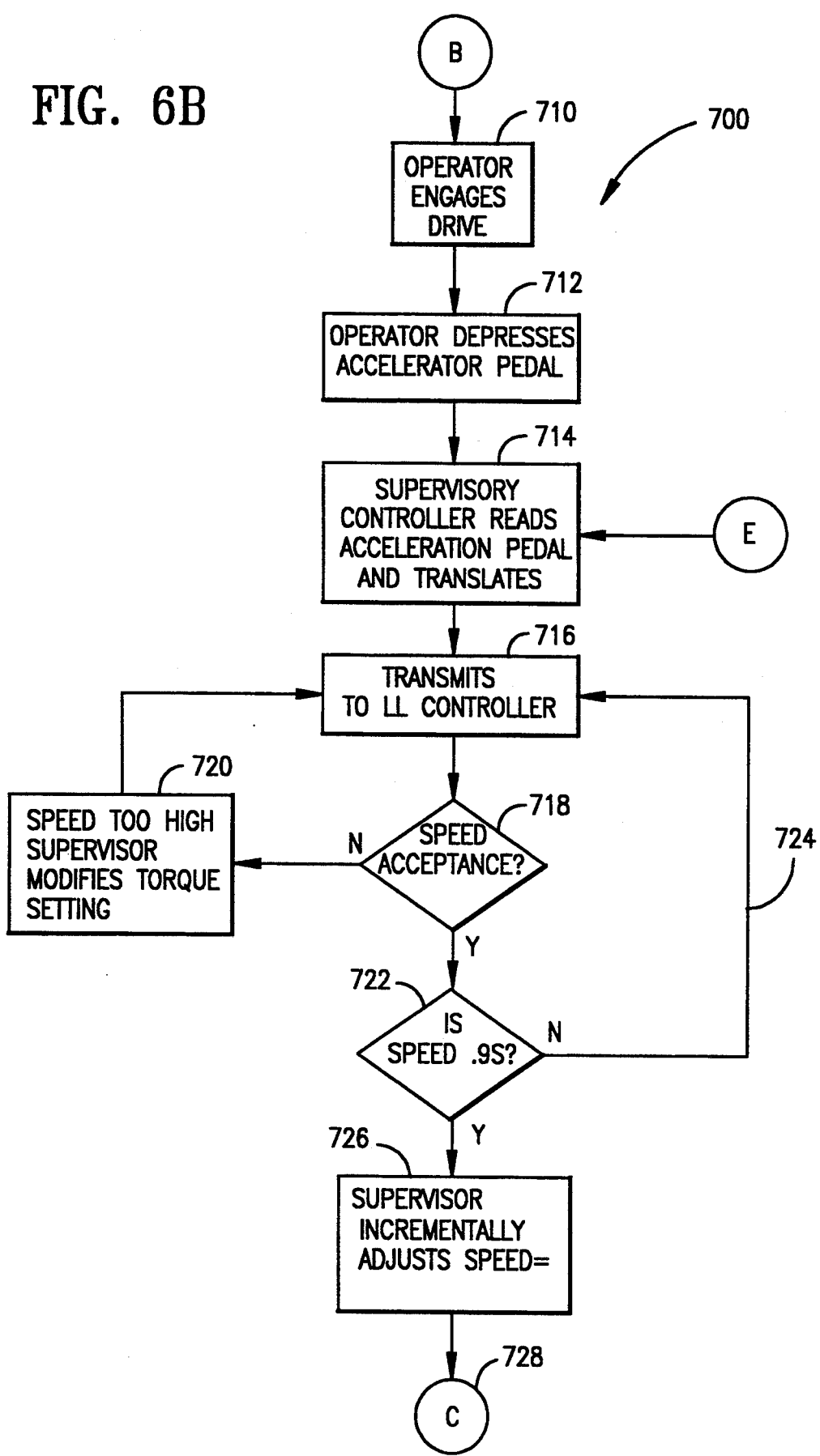
Figure 6C:
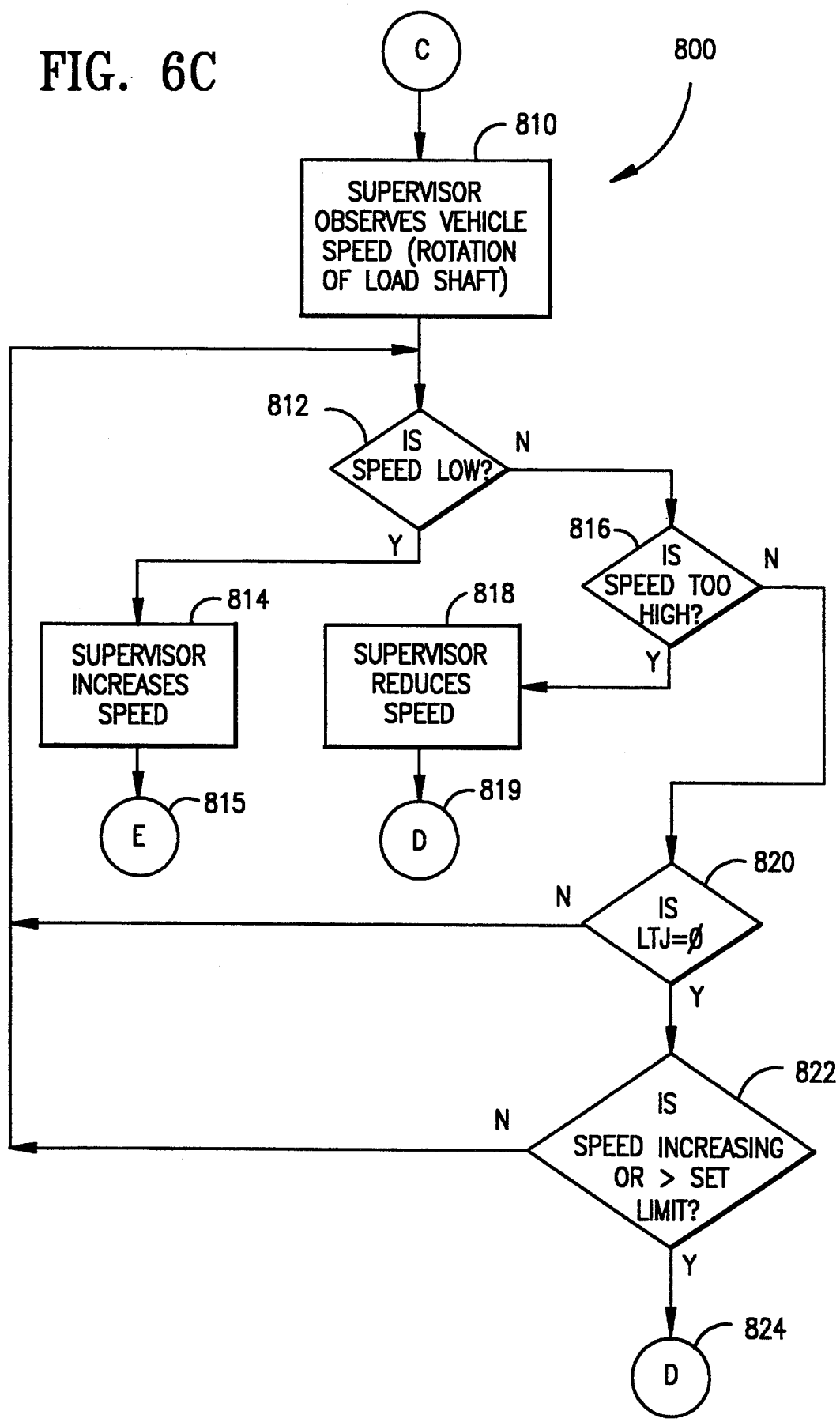
Figure 6D:
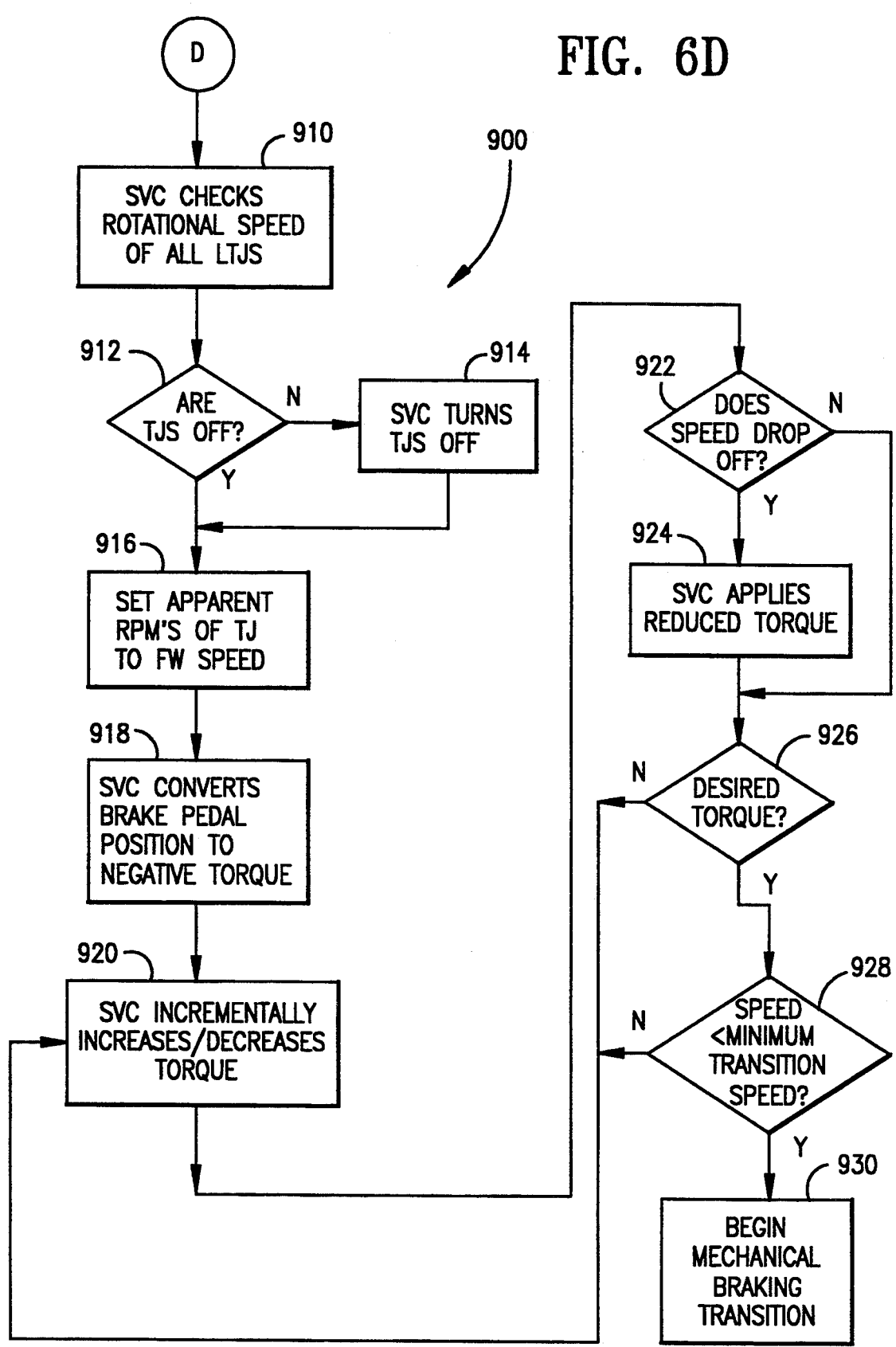

In the Drive gear, three modes exist: acceleration, deceleration and maintain. These modes are shown in FIGS. 6B, 6C and 6D. Reverse will not be separately described since it operates in a manner similar to accelerate shown in FIG. 6B.

With regard to FIG. 6B, the vehicle acceleration operation 700 is shown. The acceleration mode 700 is identical whether the car is going forward or reverse. Acceleration begins by the operator engaging the drive gear. Drive can be engaged in a manner that is known in conventional vehicles. However, the drive cannot be engaged until the flywheel is at its operational level as previously described with regards to steps 624–628 in FIG. 6A. Once the operator engages the drive, then he must press the accelerator pedal in a conventional manner.

The supervisory controller 510 reads the acceleration pedal signal to sense the acceleration level. Pedal position is then translated by the supervisor into torque and speed signals at step 714. Those signals are then transmitted through the system bus to the load torque joints through appropriate controllers 512 and 518 (FIG. 5). The PID controller then converts the torque and speed signals provided by the supervisory controller into appropriate current settings to the torque joint. As a result, pedal position is translated into an appropriate magnetization of the brushless motors to transmit flywheel torque to the loads 118.

The supervisory controller constantly monitors the overall balance of the vehicle while acceleration is occurring. Balance is also monitored during speed maintenance, deceleration and braking. Balance refers to coordination of acceleration of the load torque joints 130, 132, in order that excessive "pulling" does not result when a car is driving. Balance not only places sensors on the relative rotation of the load torque joints 130, 132, but also senses the relative position of the loads 118 to the shaft. In other words, if the car is turning to the right or to the left, and the driver places the pedal in an acceleration mode, then the acceleration of the torque joint 130, 132 may be different in order to compensate for the turn. As a result, the force of the automobile is substantially centered and excessive pulling of the vehicle does not occur.

A further condition tested by the supervisory controller 510 is torque acceptance. In other words, the supervisor controller 510 constantly tests the load shafts 140 for speed acceptance to determine if each individual tire, as well as the entire system is operating correctly, or whether an aberration exits, for example, the situation may arise in which the load 118 is being accelerated on an icy road surface. A sudden increase in the load shaft speed would thus result in the supervisory and LL controller reducing the torque load to prevent the wheels from spinning on ice. If the measured speed exceeds a pre-stored torque/speed limit stored in the controller's memory, then the torque setting is automatically reduced by the supervisory controller at step 720. Speed reduction by the supervisory controller can occur relatively quickly (within 5 milliseconds of the reading).

However, if the speed is within the acceptable range based on the pre-stored parameters, then the system tests to see if the load speed is within 90% of the accelerator pedal speed provided by the operator (desired speed) at step 722. If the speed has not yet reached the 90% threshold, then increasing acceleration is continually transmitted to the load level controllers and the speed acceptance tests occur again at step 724. However, if the speed is within 90% of the desired speed, the supervisory controller then incrementally reduces speed to equal the pedal's speed provided by the operator at step 726. Incremental reduction of the speed thereby results in a smooth acceleration to the desired speed level rather than sudden acceleration which causes excessive jerking and lurching of the automobile.

Once the desired speed is reached, then the maintain speed mode is initiated by calling the maintain operations at step 728.

FIG. 6C illustrates the speed maintain operations 800. At step 810 the supervisory controller monitors vehicle speed by measuring the rotation of the load shafts 140. As previously mentioned, speed sensing by the supervisor occurs continuously while the car is in operation. Thus, the speed maintenance steps described in this Figure occur continuously during operation.

The supervisor first tests to see if the speed is too low at step 812. If it is, then the supervisor increases the speed 814 by calling the acceleration steps previously described with regard to FIG. 6B at step 815. On the other hand, if the speed is too high 816, then the supervisory controller 510 reduces speed in accordance with the deceleration at step 918 shown in FIG. 6D. If speed is acceptable, however, then the load torque joints are tested at step 820 to see if their load is equal to 0. If the load torque joint load is not equal to 0 (i.e. the car is maintaining speed without power to the tires), then the system loops back to the supervisor test. However, if the speed is then sensed to be increasing while the load torque joints are at 0 (not providing power to the tires), then a supervisory controller tests to see if the speed has gone beyond the desired pedal level provided by the operator. If speed is not increasing or is not at the pedal limit, then the supervisor just continues to monitor operations and increases or reduces speed as previously described 822. However, if the speed is increasing or beyond the set limit, then a deceleration routine is called at step 824.

The deceleration routine is further shown with reference to FIG. 6D. At initiation of the routine, the supervisory controller 510 checks the rotational speed of all of the load torque joints 130, 132. Specifically, it first checks to see if the torque joints are turned off at step 912. If not, then the supervisory controller 510 turns the torque joints off so that energy is not being provided to the wheels while the car is accelerating. Once the torque joints are turned off, then a braking operation is initiated.

The operation begins by setting the apparent RPM's of the load torque joints equal to the difference between the rotation speed of the flywheel and that of the load shaft (140). The setting operations are done by the supervisory controller 510 monitoring flywheel and load torque joint speeds, so that the load torque joints act as motors in a no-load state. In effect, the no-load state is a state which compensates between the low RPM of the load 118 and the higher RPM of the flywheel. As a result, an active no-load condition occurs in which the motor's RPM is increased to compensate for the difference. This difference is converted into negative torque 918 by the supervisory controller, which is then transferred in the direction of the flywheel. As a result, the flywheel RPM increases. Thus, braking at this stage occurs automatically by the supervisory controller.

The negative torque is also incrementally increased by the supervisory controller 510 so that the load RPM plus the motor RPM is greater than the flywheel RPM. If braking occurs too fast, then the supervisory controller can shift to decrease the load torque joints' apparent RPM to avoid skidding.

At step 922, the supervisory controller then tests for sudden changes in load shaft speed. If so, the supervisory controller at step 924 applies reduced torque. Otherwise, the supervisory controller then tests to see if desired torque has been reached. If not, then control loops back to again incrementally reduce torque at step 920.

If the desired torque has been achieved by virtue of the deceleration operation, then the system tests whether speed is less than a minimum transition speed. In other words, final braking is accomplished by mechanical application of the brakes if the operator desires to completely stop the car or to stop it below a minimum transition speed. If the deceleration thereby falls below the transition speed, then at step 930 mechanical braking is linearly increased until the driver is entirely braking the car on his own.

A further aspect of this invention involves a novel flywheel design. A problem with current flywheels is the weight and size of the flywheel. Over the last ten years, composite flywheels have been designed to store a great deal of energy. Due to the size of the flywheels and their impressive capability for storing a large weight per hr/lb, they require large and heavy containment structures in order to protect bystanders. Some flywheel encasements weigh as much as 3,000 pounds. As a result, energy storage and production capability end up being reduced by the extremely large weight of the flywheel and its container.

To solve this problem, a number of flywheels have been designed which are of extremely light weight. The housing can also be made of a light weight material. Nonetheless, even though these housings may be more advantageous than heavier containment vessels, they still present a safety problem in the event of flywheel breakage due to its RPM. Hence, containment remains an issue and a concern. In fact, this shortcoming has been a major reason why flywheels have not been used in mass numbers in vehicles.

The present invention contemplates tackling flywheel design from a different perspective. Rather than design the flywheel to withstand breakage, the flywheel is manufactured from high strength, low ductility (brittle) "engineered" material with well defined rupture stress. Examples of such material comprise sintered alumina or other suitable materials such as other ceramics, intermediates, metals, and special polymers. One flywheel processing strategy is to sinter the power alumina up to a specified density which maintains the powder particle bounderier but provides the strength necessary for normal operating loads. The sintersing or consolidation process may also density different segments of the flywheel to different densities for strength groclation. As a result one of this construction and composition, the flywheel would fracture into small pieces when an extreme event, such as an accident, occurs. A breakdown of the flywheel would dissipate the energy and eliminate the need for a container for high energy high inertia components. The small particles would be advantageously contained by an efficient containment vessel with relatively lightweight construction. Such a material, construction and design greatly simplifies the container and would provide more assurance that the flywheel is safe.

The present invention may be embodied in other specific forms without departing from the spirit or essential characteristics thereof. The present embodiments presented are illustrative and not restrictive with the scope of the invention being indicated by the attached claims rather than the foregoing description. All changes which come within the meaning and range of equivalency of the claims are therefore intended to be embraced therein.

What is claimed is:

1. A vehicular drive system for use in a vehicle, comprising:
    flywheel means adapted to rotate;
    electric control means for providing electrical signals to control said drive system;
    driving means;
    drive shaft means connected to said driving means;
    main shaft connecting means comprising an electro-magnetic coupling having a rotor and a stator wherein said stator is connected through an output shaft to said flywheel means and said rotor is connected to said drive shaft means, said electro-magnetic coupling controlled by said electric control means to transfer torque when engaged with said drive shaft means to said flywheel means without a mechanical interface with said driving means;
    power receiving means for driving said vehicle; and
    power receiving connecting means for connecting said flywheel means to said power receiving means in order to store energy in said flywheel means for said vehicle, said power receiving connecting means comprising an electro-magnetic coupling which is controlled by said electric control means to transfer torque to and from said flywheel means without a mechanical interface with said power receiving means.

2. The vehicular drive system of claim 1 wherein said main shaft connecting means and said power receiving connecting means respectively comprise a brushless slotless motor so that said flywheel means is connected without a mechanical interface with said driving means and said power receiving means.

3. The vehicular drive system of claim 2 wherein said electric control means maintains said flywheel means' rotation between a predetermined minimum RPM and a predetermined maximum rotational speed of 8000 RPM so that a specified energy is provided to said vehicle at an optimum constant RPM.

4. The vehicular drive system of claim 1 wherein said electric control means engages said flywheel means through said main shaft connecting means to said driving means when energy must be added to spin up said flywheel means, said drive system providing sufficient energy to drive said flywheel means at an optimum constant RPM, torque and horsepower.

5. The vehicular drive system of claim 1 wherein said electric control means selectively engages/disengages said power receiving connecting means during vehicle braking such that torque from said power receiving means is transferred to said flywheel means in order to spin-up said flywheel means so that energy lost by normal dissipative braking operations are retained by said flywheel means.

6. The vehicular drive system of claim 1 wherein said driving means comprises a constant speed power source that provides said drive shaft connecting means with a torque that is greater than a maximum rotation speed for said flywheel means.

7. The vehicular drive system of claim 1 wherein said driving means comprises an internal combustion engine.

8. The vehicular drive system of claim 1 wherein said driving means comprises a constant speed electric motor.

9. The vehicular drive system of claim 1 wherein said driving means comprises a sterling engine.

10. The vehicular drive system of claim 1 wherein said flywheel means is cylindrical having a spoke connected at one end to a hub and having a rim connected to a second end of said spoke such that the mass of said flywheel means is mainly in said rim.

11. The vehicular drive system of claim 1 wherein said main shaft connecting means, said power receiving connecting means and said flywheel means are contained in a housing mounted to said vehicle.

12. The vehicular drive system of claim 1 wherein said flywheel means is made of a high strength low ductility material, including cast or molded materials, enabling said flywheel means to fracture into small particles during a catastrophic event such that said material has a well-defined failure stress and demonstrates brittle behavior during fragmentation.

13. The vehicular drive system of claim 1 wherein said flywheel means is adapted for use on a four-wheel drive vehicle whereby a respective flywheel means, main shaft connecting means and power receiving connecting means are located on each of four wheels of said vehicle.

14. A vehicular drive system for use in a vehicle, comprising:
    flywheel means having adapted to rotate;
    electric control means for providing electrical signals to control said drive system;
    drive shaft means;
    driving means in connection with said drive shaft means, said driving means comprising a constant speed power source that provides said drive shaft means with a torque that is greater than a maximum rotation speed for said flywheel means;
    main shaft connecting means comprising an electro-magnetic coupling which is controlled by said electric control means to transfer torque when engaged with said drive shaft means to said flywheel means without a mechanical interface with said driving means, said main shaft connecting means having an output shaft in engagement with said flywheel means;
    power receiving means for driving said vehicle; and
    power receiving connecting means for connecting said flywheel means to said power receiving means in order to store energy in said flywheel means for said vehicle, said power receiving connecting means comprising an electro-magnetic coupling which is controlled by said electric control means to transfer torque to and from said flywheel means without a mechanical interface with said power receiving means.

* * * * *